Patented Feb. 18, 1947

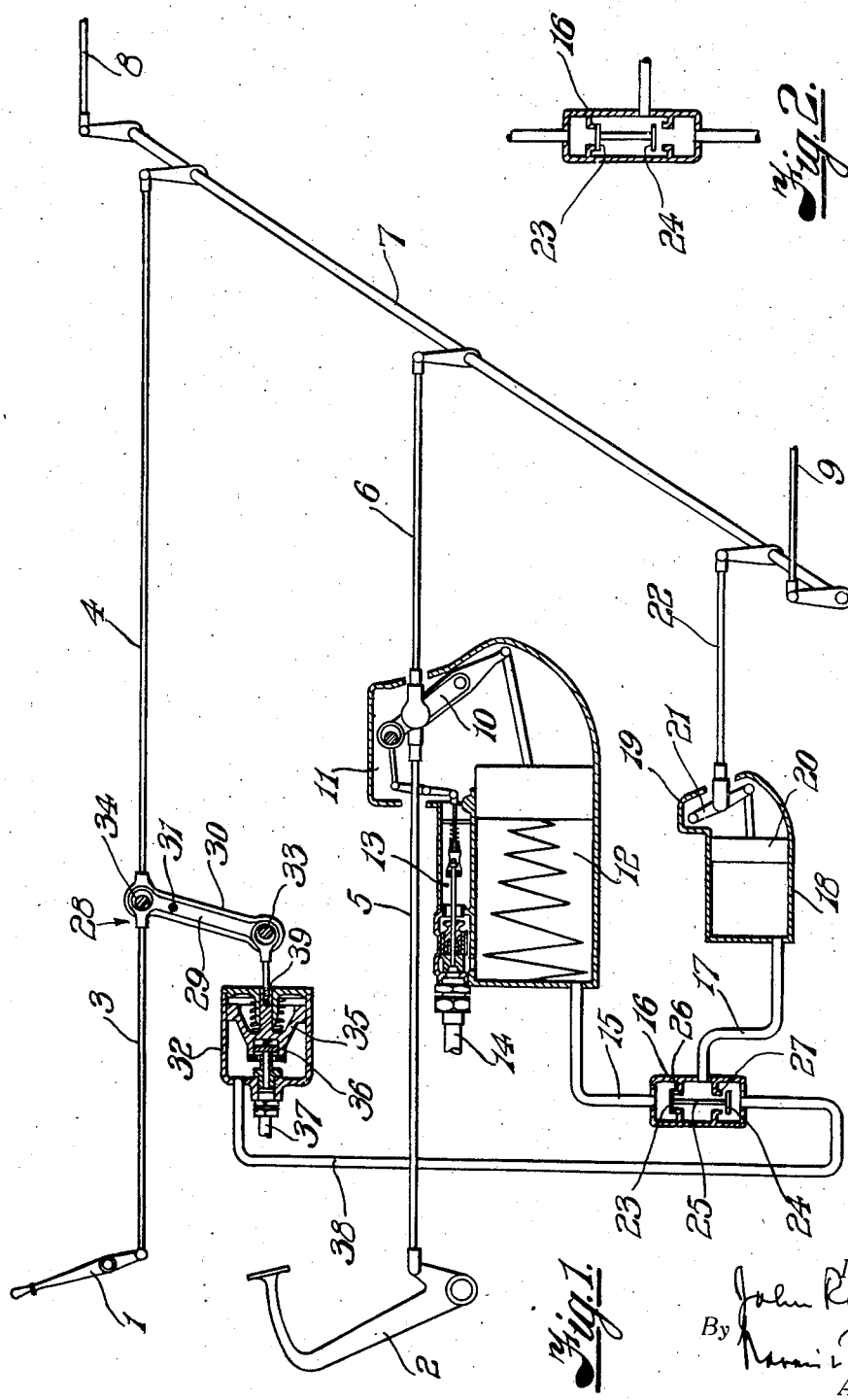

2,416,222

UNITED STATES PATENT OFFICE 2,416,222

SERVO BRAKE OPERATING MECHANISM FOR VEHICLES

John Rodway, Lincoln, England

Application November 13, 1944, Serial No. 563,267
In Great Britain July 12, 1943

6 Claims. (Cl. 188—106)

This invention relates to Servo brake operating mechanism for vehicles and to the kind which includes two independent control levers either of which can be operated to apply the same brake or brakes and each of which is provided with an independent mechanical transmission mechanism to enable the brakes to be applied mechanically by operation of either lever in the event of the failure of the power supply.

The object of the present invention is to provide an improved construction or arrangement applicable to a vehicle in which the brakes are ordinarily applied by means of a pedal controlled Servo device but in which a hand lever is also provided to control small movements at slow speed such as are required during the operations incidental to the parking of a vehicle. The invention is particularly designed to enable such operations to be carried out with Servo assistance and without the excessive torsional load in the brake cross shaft which occurs in more usual arrangements.

According to the present invention Servo brake operating mechanism for a vehicle comprises two independent control levers either of which can be operated to apply the same brake or brakes wherein actuation of one of said control levers causes operation of a main Servo device and an auxiliary Servo device to assist the application of the brake or brakes and operation of the other control lever causes operation of the auxiliary Servo device only to assist the application of the brake or brakes.

According to one form of the invention the improved Servo brake operating mechanism for a vehicle comprises two independent control levers, either of which can be operated to apply the same brake or brakes with the assistance of a main Servo device and an auxiliary Servo device in the case of the one lever and with the assistance of the auxiliary Servo device only in the case of the other lever, the power exerted in said Servo devices being transmitted to the brake cross shaft at two spaced points for the purpose of effecting a substantially reduced torsional loading upon the said cross shaft.

Reference will now be made to the accompanying drawings which illustrate constructions according to the invention and in which:

Fig. 1 shows diagrammatically a vacuum actuated Servo device for controlling the brakes of a vehicle and Fig. 2 is a detail view showing a form of changeover valve suitable for a pressure actuated system.

In the construction illustrated in Fig. 1 the brakes of a vehicle are adapted to be applied either by means of a hand lever 1 or a foot pedal 2, the hand lever being adapted to operate through transmission rods 3 and 4 and the foot pedal through transmission rods 5 and 6 onto a cross shaft 7 which is in turn connected by rods 8 and 9 to the brake mechanism on the wheels. The foot pedal 2 is connected by the rod 5 with the reaction lever mechanism 10 of a master Servo device 11 whose operating cylinder 12 is connected through a distributor valve 13 and conduit 14 to a source of vacuum. The reaction lever arrangement 10 is connected by the rod 6 to the cross shaft 7. The master Servo device indicated generally at 11 and its distributor valve 13 will not be described in detail as they are of known type and a similar arrangement is fully described for example, in the specification on United States Patent No. 2,358,753, granted September 19, 1944.

The cylinder 12 of the master Servo device is connected by a pipe 15 with a casing 16 from which a connection 17 passes to the cylinder 18 of an auxiliary or slave Servo device 19 whose piston 20 is connected through levers 21 and rod 22 to the cross shaft 7. This auxiliary Servo device has no distributor valve and is not directly connected to the source of vacuum but obtains its power when required in either of two different ways according to the conditions under which the vehicle is being operated. A changeover valve is mounted within the casing 16 and comprises two valve members 23 and 24 mounted on a common stem 25 and adapted to co-operate respectively with seatings 26 and 27 fixed within the housing 16. Whenever vacuum is exerted in the cylinder 12 of the master Servo device such vacuum is also exerted through pipe 15 and casing 16 to unseat the valve member 23 and to seat the valve member 24 so that the vacuum is also exerted through connection 17 and in the Servo cylinder 18.

The power thus exerted simultaneously in both Servo devices is transmitted to the cross shaft 7 through the rods 6 and 22. In practice the rods 4 and 6 would be placed nearer to the right hand side of the vehicle and the rod 22 nearer to the left hand side of the vehicle so that the power is transmitted to the cross shaft 7 at two spaced points thereby conducing to even distribution of power to the brakes on either side of the vehicle and appreciably reducing the torsional load carried by the central portion of the brake cross shaft.

The brake operating hand lever 1 is connected to the cross shaft 7 through the medium of a known form of lost motion mechanism indicated generally at 28 and including levers 29 and 30 connected by a common pivot indicated at 31, the lever 29 being connected to the rod 3 and the piston rod 39 of a reaction valve cylinder 32. The lever 29 has lost motion connections with a fixed pivot 33 around which lever 30 is movable and with a pivot 34 at the opposite end of the said lever 30. The reaction valve which is housed within the cylinder 32 is also of known type and comprises a piston 35 which, when moved by actuation of the hand lever, unseats a valve member 36 from a seating on the end of a vacuum connection 37 so that, thereafter, the vacuum tends to oppose the effort applied through the hand lever 1. The cylinder 32 is connected by a pipe 38 with one end of the casing 16 of the changeover valve so that when the hand lever 1 is operated to apply the brakes the mechanical transmission 3—28—4 will tend to put the brakes into operation whilst the reaction valve in cylinder 32 will place the source of vacuum supply in communication with the changeover valve in such a way as to move it to a position wherein valve member 23 is seated and valve member 24 is unseated. Communication with the cylinder 12 of the master Servo device is thereby shut-off and the cylinder 18 of the auxiliary Servo device is placed in direct communication through pipes 17, housing 16, pipe 38, cylinder 32 and pipe 37 with the source of vacuum. In this way the movement of the hand lever 1 is provided with Servo assistance on a scale suitable to the speed of movement of the vehicle when under control by the hand brake lever 1, while the power is applied to the auxiliary Servo device proportionally to the effort exerted on the hand lever. In this case, also, the loads applied to the brake cross shaft are such as will materially reduce the torsional load carried by the central portion of the cross shaft.

Although the invention has been particularly described above in conjunction with a vacuum system it is equally applicable to an air pressure system subject to alteration in the positions of the valve seatings in the changeover valve 16, which is shown separately in Figure 2 as applicable to the use of air pressure. In this arrangement the movable valve members 23 and 24 are disposed between their respective seatings. The connections to the cylinders 12, 18 and 32 would also need to be varied to enable the air under pressure to act upon the opposite sides of their respective pistons to those used for the vacuum system.

I claim:

1. Servo brake mechanism for a vehicle, comprising a brake cross shaft, a control lever, a Servo cylinder embodying reaction mechanism, connections between the reaction mechanism of said cylinder, said control lever and said cross shaft, a second control lever, a reaction valve operative by said second control lever, an auxiliary Servo cylinder, a connection between said auxiliary Servo cylinder and said cross shaft, connections between said reaction valve and both of said Servo cylinders, and a changeover valve interposed in said last-mentioned connections and adapted to render operative the auxiliary Servo cylinder independently of the first-mentioned Servo cylinder when the second control lever is actuated.

2. Servo brake mechanism according to claim 1, wherein said reaction valve is operable by said second control lever to move said changeover valve to a position wherein said auxiliary Servo cylinder is placed in direct communication with a source of power, and including lost-motion mechanism connecting said second control lever to the brake applying means and to said reaction valve to thereby enable power to be applied to the auxiliary Servo cylinder proportionally to the effort exerted and on a scale suitable to the speed and movement of the vehicle when under control of said second control lever.

3. Servo brake operating mechanism for a vehicle, comprising a master Servo cylinder having a piston therein, an auxiliary Servo cylinder having a piston therein, a brake cross shaft, means connecting the pistons in both of said cylinders to said cross shaft, two independently operable control devices, means actuated by one of said control devices to operate the master Servo cylinder, means connecting the auxiliary cylinder to a source of power when the master cylinder is operated, and means actuated by operation of the other of said control devices to shut off the master cylinder from the auxiliary cylinder and to operate the cross shaft and brakes from said auxiliary cylinder only.

4. Servo brake operating mechanism according to claim 3, wherein said last named means comprises a casing, a pair of valve members therein, a common spindle to which said valve members are fixed and movable axially in said casing by differential pressure acting on either of said valve members either to place said master and auxiliary cylinders in communication when the master cylinder is in communication with the source of power or to place the auxiliary cylinder in direct communication with the source of power when the master cylinder is inoperative.

5. Servo brake operating mechanism according to claim 3, wherein said control device for said master Servo cylinder is a foot pedal operable to cause said master Servo cylinder to be placed in communication with the source of power and with said auxiliary Servo cylinder whereby power is exerted in both of said cylinders simultaneously for actuating said brake applying cross shaft.

6. Servo brake operating mechanism, comprising two independent control levers either of which is operable to apply the same brake applying means, a reaction valve interposed between one of said control levers and the brake applying means, a master Servo device having reaction mechanism connected to the other of said control levers and to the brake applying means, an auxiliary Servo device also connected to said brake applying means, connections between said reaction valve and said master Servo device and a source of power, a connection from said reaction valve to both of said Servo devices, and a changeover valve interposed in said connection and operative automatically to connect said Servo devices when one of said control levers is operated and to connect the auxiliary Servo device only to the source of power when the other of said control levers is operated.

JOHN RODWAY.

REFERENCES CITED

The following references are of record in the file of this patent:

UNITED STATES PATENTS

| Number | Name | Date |
|---|---|---|
| 1,848,458 | Bragg et al. | Mar. 8, 1932 |
| 1,650,488 | Bragg et al. | Nov. 22, 1927 |
| 2,042,392 | Dewandre | May 26, 1936 |